(12) United States Patent
Rommel

(10) Patent No.: US 10,436,923 B2
(45) Date of Patent: Oct. 8, 2019

(54) METHOD AND APPARATUS FOR RECEIVER-SIDE DEGHOSTING OF SEISMIC DATA

(71) Applicant: CGG SERVICES SA, Massy (FR)

(72) Inventor: Bjorn Eino Rommel, Sandefjord (NO)

(73) Assignee: CGG SERVICES SAS, Massy (FR)

( * ) Notice: Subject to any disclaimer, the term of this patent is extended or adjusted under 35 U.S.C. 154(b) by 1186 days.

(21) Appl. No.: 14/300,443

(22) Filed: Jun. 10, 2014

(65) Prior Publication Data
US 2015/0009780 A1 Jan. 8, 2015

Related U.S. Application Data

(60) Provisional application No. 61/833,547, filed on Jun. 11, 2013.

(51) Int. Cl.
*G01V 1/38* (2006.01)
*G01V 1/36* (2006.01)

(52) U.S. Cl.
CPC ............ *G01V 1/364* (2013.01); *G01V 1/3808* (2013.01); *G01V 2210/56* (2013.01)

(58) Field of Classification Search
CPC .... G01V 1/38; G01V 2210/56; G01V 1/3808; G01V 1/364
USPC .............................. 367/23, 24; 181/110, 111
See application file for complete search history.

(56) References Cited

U.S. PATENT DOCUMENTS

| | | | | |
|---|---|---|---|---|
| 3,952,281 | A | * | 4/1976 | Parrack ................... G01V 1/36 181/112 |
| 3,979,713 | A | * | 9/1976 | Parrack ................ G01V 1/3808 367/20 |
| 4,353,121 | A | | 10/1982 | Ray et al. |
| 4,992,992 | A | | 2/1991 | Dragoset, Jr. |
| 5,148,406 | A | * | 9/1992 | Brink ...................... G01V 1/28 367/20 |
| 8,451,682 | B2 | | 5/2013 | Soubaras |
| 8,531,912 | B2 | | 9/2013 | Soubaras |
| 2012/0033526 | A1 | * | 2/2012 | Hegna et al. ............ G01V 1/38 367/21 |
| 2012/0092956 | A1 | | 4/2012 | Soubaras |
| 2013/0107663 | A1 | * | 5/2013 | Moldoveanu ........ G01V 1/3817 367/16 |

FOREIGN PATENT DOCUMENTS

FR 2955397 A1 7/2011

OTHER PUBLICATIONS

D.J. Monk, "Fresnel-Zone Binning: Fresnel-Zone Shape with Offset and Velocity Function", Geophysics, Jan.-Feb. 2010, pp. T9-T14, vol. 75, No. 1.

* cited by examiner

*Primary Examiner* — Ian J Lobo
(74) *Attorney, Agent, or Firm* — Patent Portfolio Builders PLLC

(57) ABSTRACT

Apparatus, computer instructions and method for combining first and second records to form a substantially deghosted seismic record.

21 Claims, 14 Drawing Sheets

METHOD AND APPARATUS FOR RECEIVER-SIDE DEGHOSTING OF SEISMIC DATA

BACKGROUND

Technical Field

Embodiments of the subject matter disclosed herein generally relate to methods and systems and, more particularly, to mechanisms and techniques for deghosting seismic data.

Discussion of the Background

Marine seismic data acquisition and processing generate a profile (image) of the geophysical structure (subsurface) under the seafloor. While this profile does not provide an accurate location for oil and gas reservoirs, it suggests, to those trained in the field, the presence or absence of reservoirs. Thus, providing a high-resolution subsurface image is an ongoing process for the exploration of natural resources, including, among others, oil and/or gas.

During a seismic gathering process, a seismic survey system 100, as shown in FIG. 1, includes a vessel 102 that tows plural receivers 104 distributed along a streamer 106. Vessel 102 may tow plural streamers 106 at the same time. The streamers may be disposed horizontally, i.e., lying at a constant depth $z_1$ relative to the ocean surface 110. Also, the plural streamers 106 may form a constant angle (i.e., the streamers may be slanted) with respect to the ocean surface as disclosed in U.S. Pat. No. 4,992,992, the entire content of which is incorporated herein by reference.

Still with reference to FIG. 1, each streamer may have a head float 106a and a tail float 106b connected to respective streamer ends for maintaining the given depth $z_1$. A front-end gear 112 that includes various cables connects streamers 106 to vessel 102. Vessel 102 also tows a sound source 120 configured to generate an acoustic wave 122a. Acoustic wave 122a propagates downward and penetrates the seafloor 124, eventually being reflected by a reflecting structure 126 (reflector). The reflected acoustic wave 122b propagates upward and is detected by detector 104. For simplicity, FIG. 1 shows only one path 122a corresponding to the acoustic wave. However, the acoustic wave emitted by the source 120 may be substantially spherical, e.g., it propagates in all directions starting from source 120. Parts of the reflected acoustic wave 122b (primary) are recorded by the various detectors 104 (the recorded signals are called traces) while parts 122c of the reflected wave 122b pass the detectors 104 and arrive at the water surface 110. Since the interface between the water and air is well approximated as a quasi-perfect reflector (i.e., the water surface acts as a mirror for the acoustic waves), reflected wave 122c is reflected back toward another detector 104 as shown by wave 122d in FIG. 1. Wave 122d is normally referred to as a ghost wave because it is due to a spurious reflection. Ghosts are also recorded by detectors 104, but with a reverse polarity and a time lag relative to primary wave 122b. The degenerative effect that the ghost arrival has on seismic bandwidth and resolution are known. In essence, interference between primary and ghost arrivals causes notches, or gaps, in the frequency content recorded by the detectors, which reduces the useful bandwidth.

The recorded traces may be used to determine the subsurface (i.e., earth structure below surface 124) and to determine the position and presence of reflectors 126. However, ghosts disturb the final subsurface image's accuracy and for at least this reason, various methods exist for removing ghosts, i.e., deghosting, from recorded seismic data.

Such methods are described in U.S. Pat. Nos. 4,353,121 and 4,992,992 (the entire content of which are incorporated herein by reference) but they are seismic processing procedures in one dimension and in two dimensions. Such procedures, however, cannot be generalized to three dimensions. This is so because a sampling interval of the sensors in the third dimension is given by the separation between the streamers, on the order of 150 m, which is much larger than the sensors' sampling interval along the streamers, which is on the order of 12.5 m. Also, existing procedures may apply a deghosting step at the beginning of processing, which is not always very efficient.

Improved deghosting methods are described in U.S. patent application Ser. No. 13/155,778, filed Jun. 8, 2011, and being assigned to the assignee of the present disclosure. The entire content of this application is incorporated herein by reference.

However, there is still a need to provide systems and methods that are more efficient than the existing methods.

SUMMARY

According to an exemplary embodiment, there is a method for seismic data acquisition and processing. The method includes generating a first seismic wave at a source position (Xs, Ys, Zs); recording the first seismic wave, after undertaking a seismic event, at a first receiver position (X1, Y1, Z1), to obtain a first record; generating a second seismic wave substantially at the same source position (Xs, Ys, Zs); recording the second seismic wave, after undertaking the seismic event, at a second receiver position (X2, Y2, Z2), to obtain a second record; and combining the first and second records to form a substantially deghosted seismic record. The first receiver position and the source position are characterized by a first source-receiver offset and a first common depth-point, the second receiver position and the source position are characterized by a second source-receiver offset and a second common depth-point. The first source-receiver offset is substantially the same as the second source-receiver offset, the first common depth-point is substantially the same as the second common depth-point, and a first depth (Z1) of the first receiver position is significantly different than a second depth (Z2) of the second receiver position.

According to another embodiment, there is a method for seismic data acquisition and processing. The method includes generating a first seismic wave at a first source position (Xs1, Ys1, Zs1); recording the first seismic wave, after undertaking a seismic event, at a first receiver position (X1, Y1, Z1), to obtain a first record; generating a second seismic wave at a second source position (Xs2, Ys2, Zs2); recording the second seismic wave, after undertaking the seismic event, at a second receiver position (X1, Y1, Z2), to obtain a second record; and combining the first and second records to form a substantially deghosted seismic record. A first depth (Z1) of the first receiver position is substantially different from a second depth (Z2) of the second receiver position.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine seismic survey that includes a vessel and two seismic sources. However, the embodiments to be discussed next are not limited to this specific configuration, but may be applied to other configurations and also to land seismic surveys.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for deghosting seismic data by using a configuration in which pairs of sensors and receivers share a common midpoint and offset, and the receivers from different pairs have different depths. Although the method is applicable to marine and land environments, for simplicity, a marine environment is used next.

According to an embodiment, the seismic data is collected using streamers having a variable-depth profile, i.e., part of the detectors are not provided on a slanted streamer, although the detectors have varying depths relative to the water surface. These kinds of streamers were disclosed in French filed Patent Application Serial No. FR1052576, entitled, Method and Device to Acquire Marine Seismic Data, the entire content of which is incorporated herein by reference, and also in U.S. patent application Ser. No. 13/272,428 (herein '428), entitled, Method and Device to Acquire Seismic Data, and filed Oct. 13, 2011, the entire content of which is incorporated herein by reference. However, the method described later for seismic data acquisition also applies to slanted streamers or horizontal streamers having different depths.

The process of gathering marine seismic data has been discussed in '428 and thus, this process is not repeated herein. Further, the above-identified patent application identified the possibility of gathering data not only by using traditional streamers, i.e., the detectors lying along horizontal lines or along a slanted line, but also using novel streamers in which part of the detectors may lie on a curved profile or streamers that have multiple slanted sections.

Figure 1:
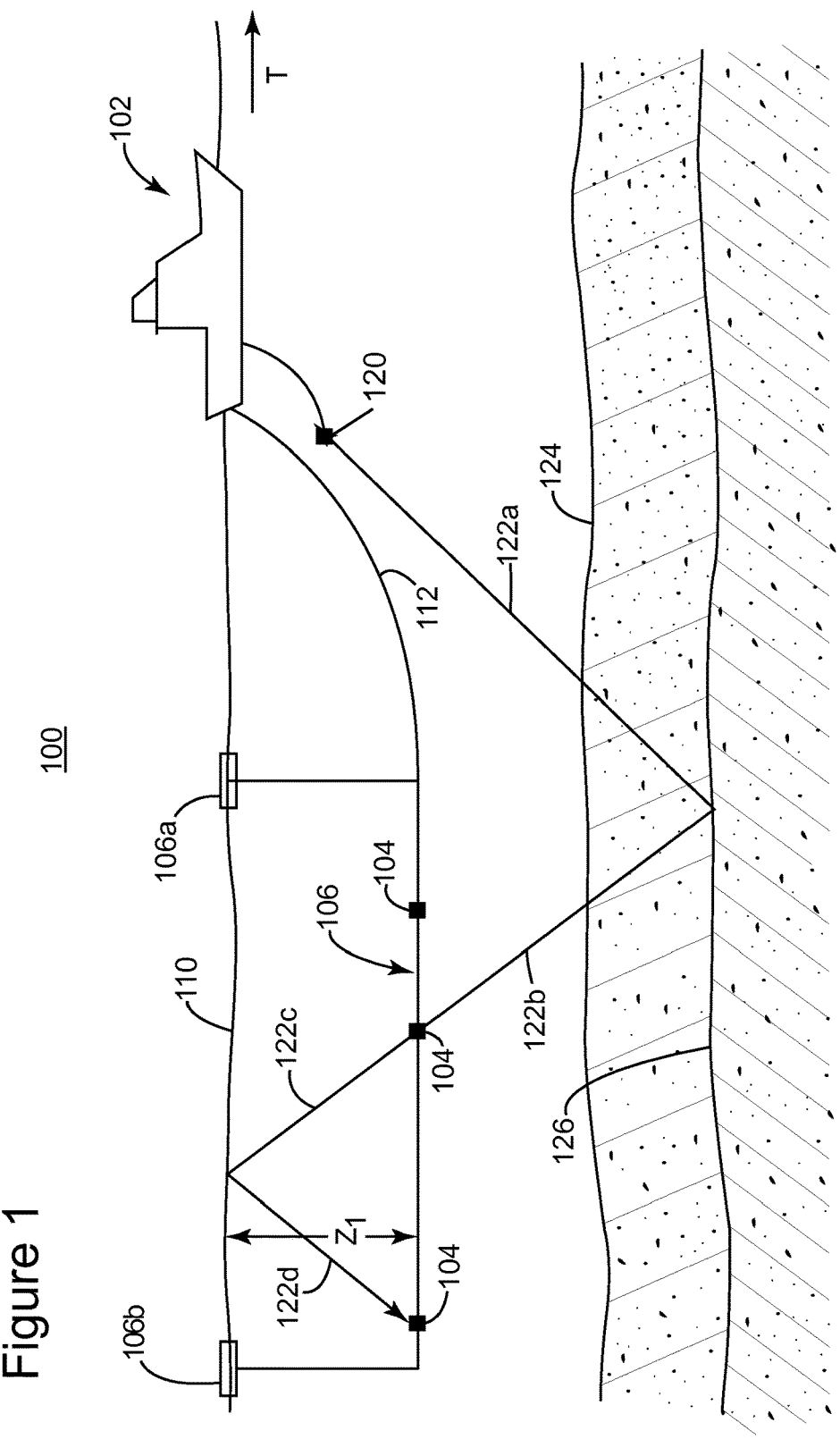
FIG. 1 is a schematic diagram of a conventional seismic data acquisition system having a horizontal streamer.
Figure 2:
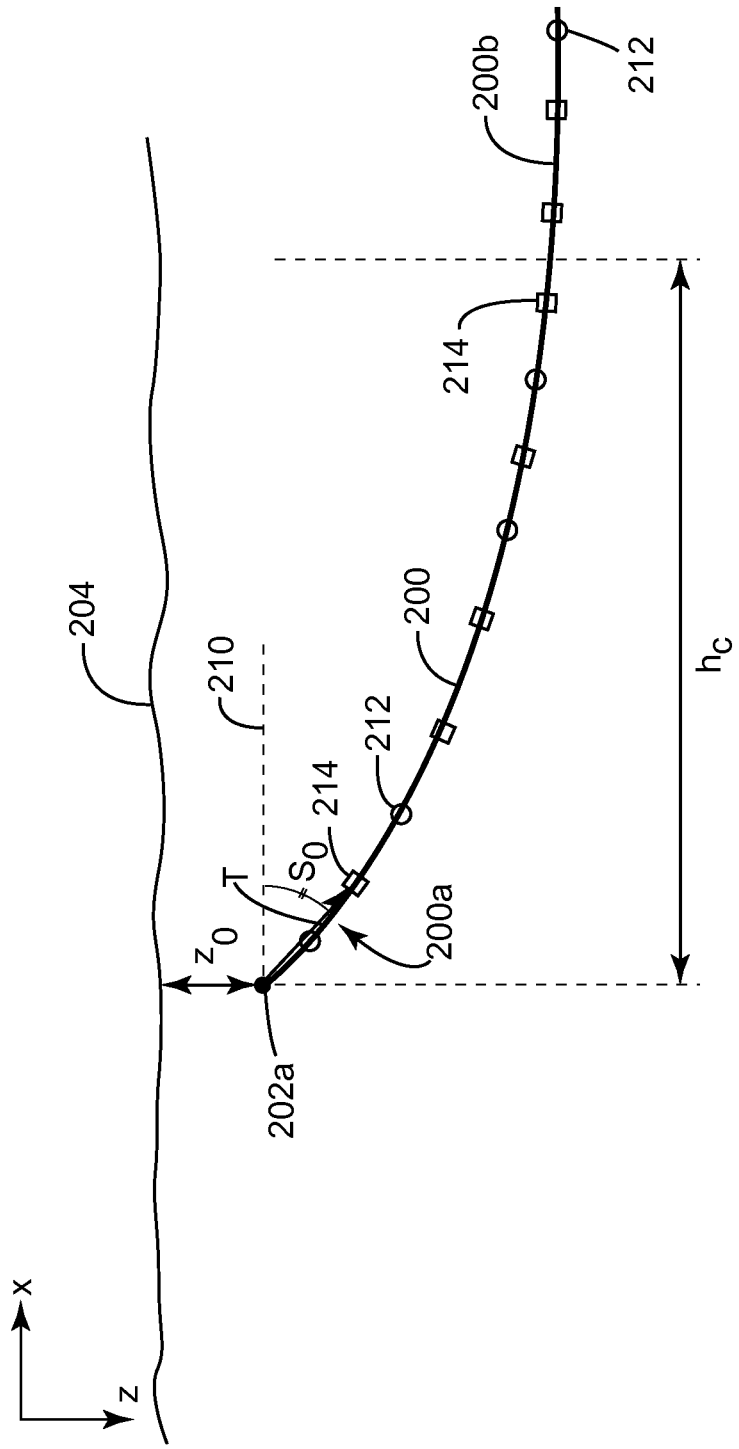
FIG. 2 is a schematic diagram of a curved streamer.

Such configuration is illustrated in FIG. 2, in which a streamer 200 has a variable-depth (curved) profile. This profile may be parameterized by three parametric quantities, $z_0$, $s_0$ and $h_c$. Note that not the entire streamer has to have the curved profile. In other words, the curved profile should not be construed to always apply to the entire length of the streamer. While this situation is possible, the exemplary embodiments do not prohibit a streamer having only a portion of its length curved. The first parameter $z_0$ indicates the first detector 202a's depth relative to the water surface 204. This parameter may have a value in the range of meters to tens of meters. For example, $z_0$ may be around 6 m. However, as would be recognized by those skilled in the art, the value of $z_0$ depends on each application and may be related to the ocean bottom's depth, the depth of the reflectors, the power of the sound source, etc.

The second parameter $s_0$ is related to the slope of the initial part 200a of the streamer 200 relative to a horizontal line 210. This parameter $s_0$ is determined by a tangent T to the initial part 200a of the streamer and the horizontal line 210. Note that the slope of the curved profile at point 202a is given by a ratio of the change of the curved profile along the Z axis with respect to the change along the X axis. The slope is thus equal to the mathematical value of the tangent of the angle $s_o$, i.e., slope (at point 202a in FIG. 2)=$\tan(s_0)$. Further, note that for small angles (e.g., five or fewer degrees), $\tan(s_0)$ is approximately equal to $s_o$, if the angle is expressed in radians and not in degrees. Thus, for small angles, the slope and the angle may be used interchangeably. In one embodiment, the value of $s_0$ may be between 0 and 6 degrees. The example shown in FIG. 2 has an initial angle $s_0$ equal to substantially 3 degrees. Note that the profile of streamer 200 in FIG. 2 is not drawn to scale because an angle of 3 degrees is a relatively small quantity.

The third parameter $h_c$ indicates a horizontal length (distance along the X axis in FIG. 2 measured from first detector 202a) of the streamer's curved portion. This parameter may be in the range of hundreds to thousands of meters. For example, $h_c$ is around 3,000 m for the configuration shown in FIG. 2. This parameter defines the end of the curved part of streamer 200. In other words, streamer 200 may have a first portion 200a with a first curved profile and a second portion 200b that is either flat or has a different curved profile. Parameter $h_c$ defines first portion 200a. Note that in one application streamer 200 has both first portion 200a and second portion 200b, while in another application streamer 200 has only first portion 200a. In other words, in some embodiments, the streamer does not extend along the entire curved profile, i.e., a length of the streamer projected on X axis is less than $h_c$. Receivers 212 are shown distributed along the streamers. The receivers may include a hydrophone, an accelerometer or any other device that can receive a seismic signal in a marine environment or any number of the aforementioned devices that are substantially co-located. "Substantial co-location" shall mean herein such a spatial configuration of the locations of all devices within the receiver that seismic processing can effectively be performed by assuming a single location of the receiver. For practical purposes, receiver depth shall mean vertical distance from the receiver to the ocean surface.

According to another embodiment, streamer 200's curved profile may be described, approximately, by the following equations:

$$z(h) = z_0 + s_0 h \left(1 - 0.5\left(\frac{h}{h_c}\right)\right) \quad (1)$$
for
$h \leq h_c$,
and $$z(h) = z_0 + s_0 \cdot 0.5 \cdot h_c \quad (2)$$
for
$h > h_c$.

In these equations, z is measured along the Z axis and h is measured along the X axis, where Z is perpendicular to the water surface and X extends along the water surface. Also, note that only equation (1) may be enough to define the streamer's shape, depending on the streamer's length. In other words, in some embodiments, the streamer does not have to have the flat portion. For these specific equations, it was found that clarity of the sub-surface images improved substantially. Those skilled in the art would understand that the values provided by equations (1) and (2) are approximate because receivers 212 are under constant motion exerted by various water currents and the vessel's movement. In other words, it is understood that detectors provided substantially on the curved profile described by equation (1) and/or (2), e.g., at positions as close as 10 to 20% to the real curve in terms of actual depth z(h), are envisioned to be covered by the above-mentioned equations. The same is true for birds 214 configured to maintain the curved profile, which may be one of a parabola, a circle, a hyperbola or a combination of these shapes.

Figure 3:
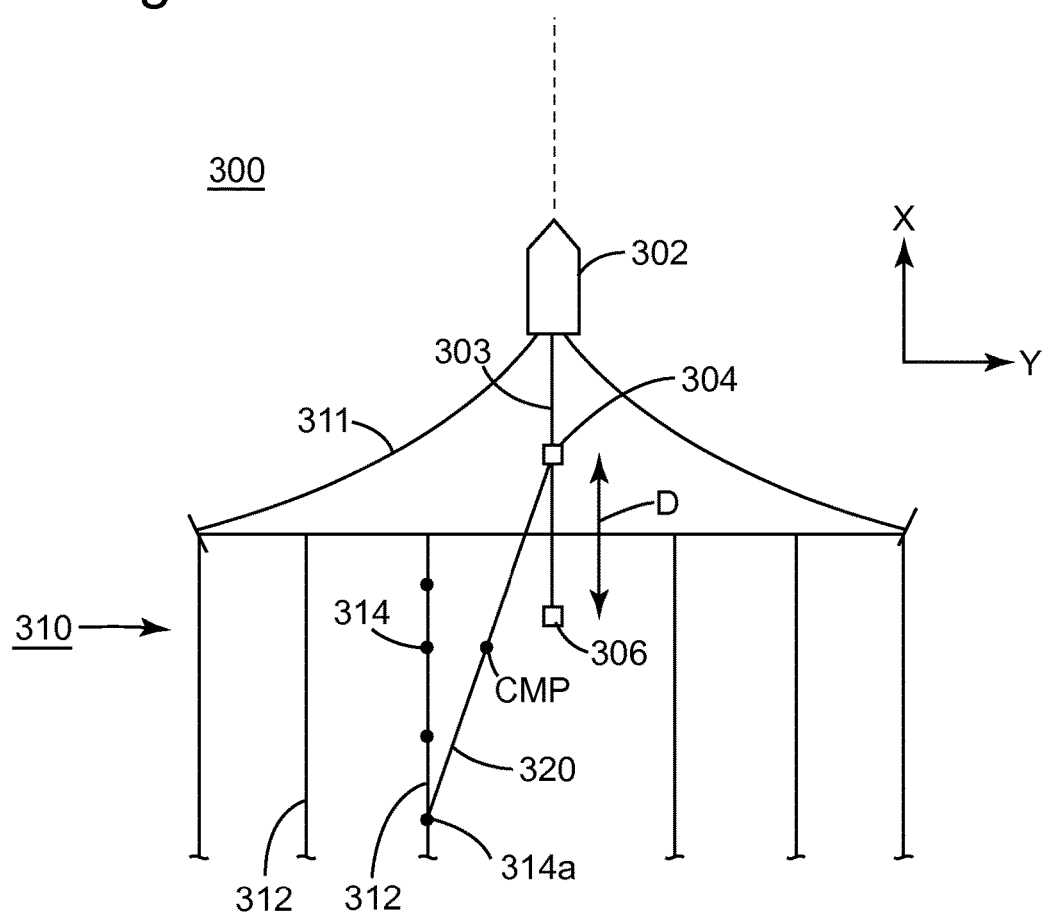
FIG. 3 is a plane view of a seismic survey system according to an embodiment

Within this context, now discussed is an embodiment that uses a novel configuration for recoding seismic data. FIG. 3 illustrates a plan view of a seismic recording system 300 that includes a vessel 302 towing at least two sources, a first source 304 and a second source 306. An umbilical 303 connects first source 304 to vessel 302. Second source 306 is offset along the inline direction (i.e., X axis in FIG. 3) from first source 304 by a predetermined distance D, which may be in the tens or hundreds of meters, depending on a distance between adjacent streamers.

A seismic source shall mean herein an air gun, a pinger, a marine vibrator, an explosive device or any other device which can emit a seismic signal into a marine environment or any number and combination of the aforementioned devices that are substantially co-located and substantially co-actuated. "Substantial co-location" shall mean herein such a spatial configuration of the locations of all devices within the seismic source that seismic processing can effectively be performed by assuming a single location of the seismic source. "Substantial co-actuation" shall mean herein such a temporal configuration of the actuating times of all devices within the seismic source that seismic processing can effectively be performed by assuming a single actuation time of the seismic source.

Figure 4:
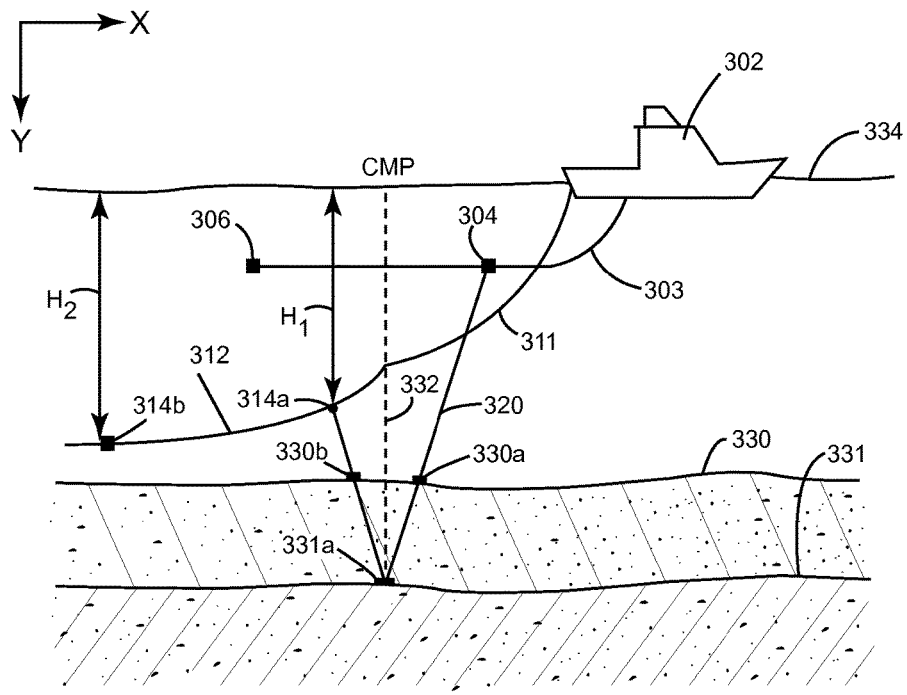
FIG. 4 is a side view of a seismic survey system according to an embodiment.
Figure 5:
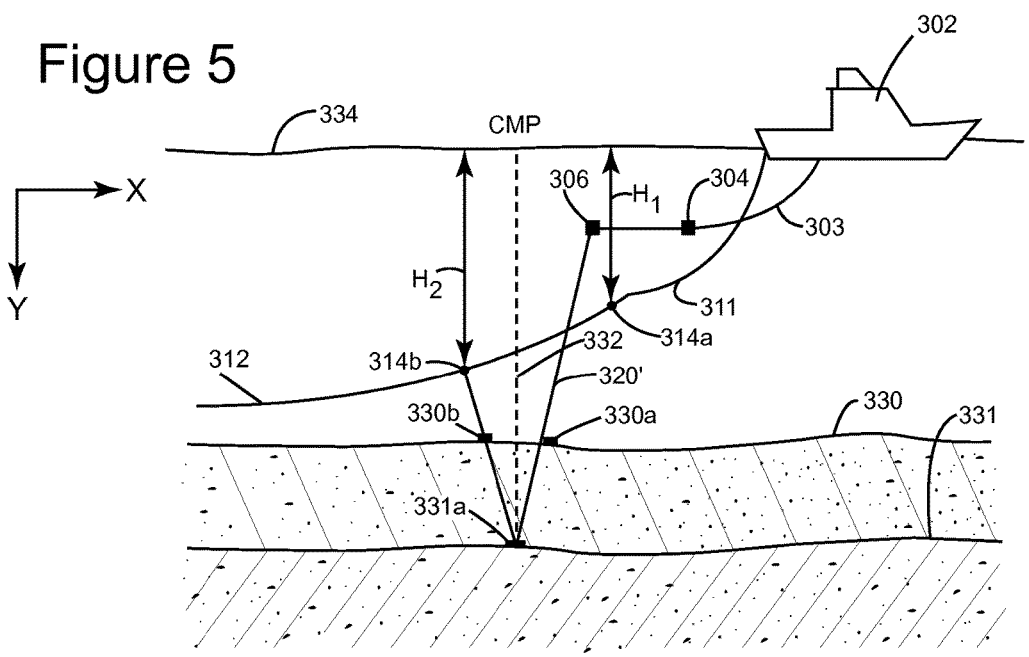
FIG. 5 is a side view of the seismic survey of FIG. 4 after the vessel has advanced a predetermined distance according to an embodiment.

FIG. 3 also shows a streamer spread 310 that includes plural streamers 312 connected by a front-end gear 311 to vessel 302. Each streamer may include one or more receivers 314, and each streamer has a variable-depth profile. For the purpose of illustrating some novel features associated with this embodiment, a single ray path 320 is considered and illustrated in the figure. Ray path 320 leaves first source 304, travels toward ocean bottom 330 (see FIG. 4 that shows system 300 in a lateral view), where it gets reflected, and then travels toward receiver 314 where it gets recorded. A line 332 that is substantially perpendicular to the water surface and also intersects the point where the ray path 320 is reflected is illustrated in FIGS. 4 and 5. A point where line 332 intersects the water surface 334 is called common midpoint (CMP). The CMP shall herein mean the location on the surface, halfway between the location of the seismic source and the receiver. In a typical seismic acquisition, a common midpoint is typically shared by numerous combinations of locations of a seismic source and of a seismic sensor. For each seismic record, information about the location of the corresponding common midpoint or, equivalently, locations of the corresponding seismic source and of the corresponding seismic sensor are recorded in a header of the seismic record.

In one application, "source-sensor offset" shall mean the horizontal distance between an emitting seismic source and a receiving seismic sensor. For practical purposes, "substantially the same source-sensor offset" shall mean an offset between an emitting seismic source and a seismic receiver such that the horizontal distance between the center of a small area containing the location of the respective emitting seismic sources and the center of a small area containing the location of the respective seismic receiver, where small areas are commonly known as bin or similar measure of tolerance, is the same as the source-sensor offset, also known as the "nominal source-sensor offset" to a person skilled in the art.

In a seismic survey, as a person skilled in the art knows, a seismic signal is emitted from a seismic source and propagates downward (notwithstanding surface multiples on the source side and internal multiples, etc.) to the water bottom and further to a seismic interface, where it is reflected and then propagates upward (notwithstanding surface multiples on the receiver side and internal multiples, etc.) from the seismic interface to the water bottom and farther up, and is received by at least one seismic receiver. Of particular interest in this embodiment are seismic signals that propagate essentially through the same volume of solid earth, as physically definable by the Fresnel volume, but are received by seismic sensors placed at significantly different sensor depths. "Substantially the same ray path" shall include any ray path from a first small area 330a on the water bottom 330 downward to a small area 331a on a seismic interface 331, and from the small area 331a on the seismic interface 331 upward to a second small area 330b on the water bottom 330, where the small area on the seismic interface can be chosen to mean a conventional bin, or a Fresnel zone, or similarly geometrically or physically or otherwise defined area as known by a person skilled in the art. The ray paths from the respective seismic sources to the first small area on the water bottom and the ray paths from the second small area on the water bottom to the respective seismic receivers are excluded from the above definition. For shallow targets, in one example, a Fresnel zone will be within a radius of a few meters, while for deep targets, in another example, a Fresnel zone will be within a radius of a few tens of meters. The size of a Fresnel zone also varies with frequency, meaning that for high-resolution seismic surveys a Fresnel zone can be small (less than a radius of 1 m). In some examples, the use of interpolation techniques may extend these distances, as is known in the art. Determination of the Fresnel-zone is described, for example, in Monk, "Fresnel-zone binning: Fresnel-zone shape with offset and velocity function," Geophysics, 2010 75: T9-14, the entire content of which is incorporated here by reference. The known difference in receiver depths results in a variation in the two-way travel time within substantially the same ray path. In some examples, this difference is accounted for during processing.

FIG. 5 is identical to FIG. 4 except that vessel 302 has traveled a distance D along X axis, and a seismic wave generated by the second source 306 is generated and recorded by a second receiver 314b. Note that a current location of source 306 coincides with the source 304 location in FIG. 4. Also note that second receiver 314b does not have to be adjacent to first receiver 314a along streamer 312. In one application, the two receivers do not have to be on the same streamer as long as the CMP and offset of the first pair (e.g., first source 304 and first sensor 314a) are substantially the same as those of a second pair (e.g., second source 306 and second sensor 314b). Note that first and second sources share the same depth, while first receiver 314a has a first depth $H_1$ and second receiver 314b has a second depth $H_2$, different from the first depth. This particular configuration of shooting first and second sources so that the first and second pairs share the same CMP and offset has the advantage that the ray path connecting the first seismic source via the reflector to the first sensor and the one connecting the second seismic source via the reflector to the second sensor are essentially the same, except for the extra legs of the respective ghosts (because of the different receiver depths).

In this way, two records (one each from first receiver 314a and second receiver 314b) are obtained that have the same seismic signals, but different ghosts. Thus, using traditional stacking algorithms, it is possible to create a single record with a deghosted seismic signal. In other words, using the resulting notch diversity, it is possible to construct a seismic record that is at least partially deghosted on-the-receiver-side. Such stacking algorithms may include one of (1) Posthumus stacking, (2) brute stacking, (3) pre-stack deconvolution and stacking, or (4) matched filtering, pre-stack deconvolution and stacking.

Figure 6:
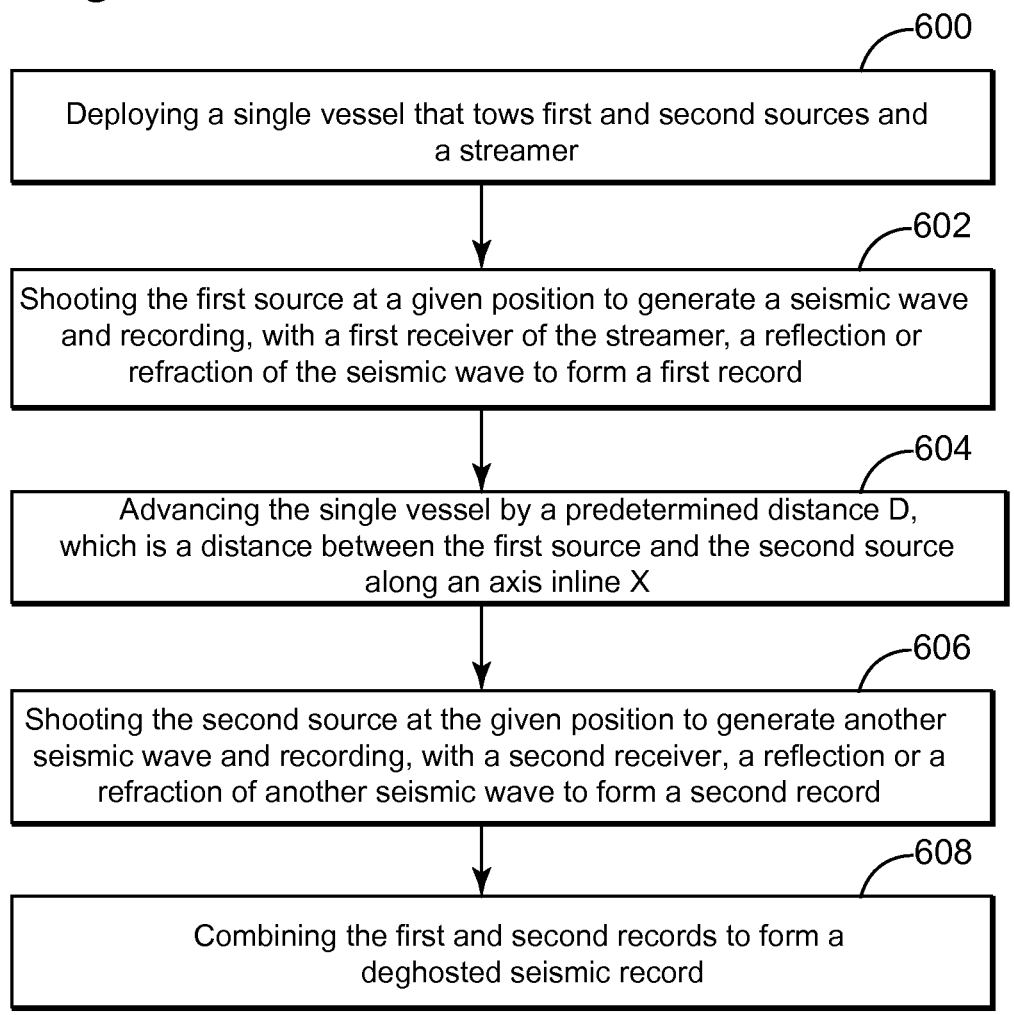
FIG. 6 is a flowchart of a method for data acquisition according to an embodiment.

A method for seismic data acquisition related to a subsurface is now discussed with regard to FIG. 6. The method may include a step 600 of deploying a single vessel (302) that tows first and second (304, 306) sources and a streamer (312), a step 602 of shooting first source (304) at a given position to generate a seismic wave (320) and recording, with first receiver (314a) of streamer (312), a reflection or refraction of seismic wave (320) to form a first record, a step 604 of advancing single vessel (302) by a predetermined distance D, which is a distance between first source (304) and second source (306) along an inline axis X, a step 606 of shooting second source (306) at the given position to generate another seismic wave (320') and recording, with a second receiver (314b), a reflection or a refraction of another seismic wave (320') to form a second record, and a step 608 of combining the first and second records to form a deghosted seismic record. The first and second record have substantially the same source-receiver offset, substantially the same common midpoint, and the first receiver has a different depth than the second receiver. The term "substantially" is understood in this context by those skilled in the art to mean in a range of between zero and 30% due to the fact that both sources and streamers are not perfectly controllable in terms of their positions when towed behind a vessel.

The method uses a depth difference between the first and second receivers in such a way that a first seismic ghost recorded by the first receiver and a second seismic ghost recorded by the second receiver substantially differ from each other. The "depth difference" shall include such offsets between the seismic receivers and, respectively, such different receiver depths that, over time, each seismic source emits at least one seismic signal such that the emitted seismic signals travel along substantially the same ray path and are superposed by their respective seismic ghosts and are received by the seismic sensors such that the received composite signals show such a sufficient notch diversity that the process of deghosting with any aforementioned method can reconstruct a substantially or fully deghosted seismic signal. "Sufficient notch diversity" shall mean herein that (1) for each spectral frequency within a certain desired seismic bandwidth, there is at least one record in which the spectral amplitude of the composite seismic signal exceeds the spectral amplitude of the inevitable noise, and that (2) the seismic bandwidth shall include at least one notch frequency in at least one record such that the process of deghosting can reconstruct a substantially or fully deghosted seismic signal. For example but without limitation, while in one record a notch frequency shall exist within a desired seismic bandwidth, in another record for the same notch frequency the spectral amplitude of a composite signal shall exceed the spectral amplitude of noise, and then deghosting by any of the aforementioned methods can substantially reconstruct a deghosted seismic signal. Hence, the second part shall also indicate that the seismic bandwidth can, and usually will, be extended beyond the (lowermost) first notch frequency, in contrast to what in conventional processing is usually considered its upper limit.

The method may also include a step of collecting location information on the first source's given position, shooting timings of the first and second sources, and location information associated with the first and second receivers at the time of shooting.

Note that first and second seismic sources may be actuated sequentially, randomly or simultaneously. First and second seismic sensors may be located on a same or different streamer as long as their depths are different. In one application, two portions of a streamer that house first and second sensors have different angles with respect to the sea surface. The above-noted method may also be used with a record of a first or second seismic signal being transformed by means of reciprocity into a record that would have been obtained if the locations of the respective seismic source and seismic sensor were interchanged. The method may also include a plurality of records having substantially the same common midpoint.

In one embodiment, each receiver is connected via electric, optical or other suitable types of communication lines to a recording device that records seismic signals received by the seismic receiver at least for the time needed to acquire the first and second seismic signal before processing them. A "seismic record" may be the received and recorded collection of at least one seismic signal and a header containing associated information about at least the source-sensor offset and common midpoint, sensor depth and receiving time.

Figure 7:
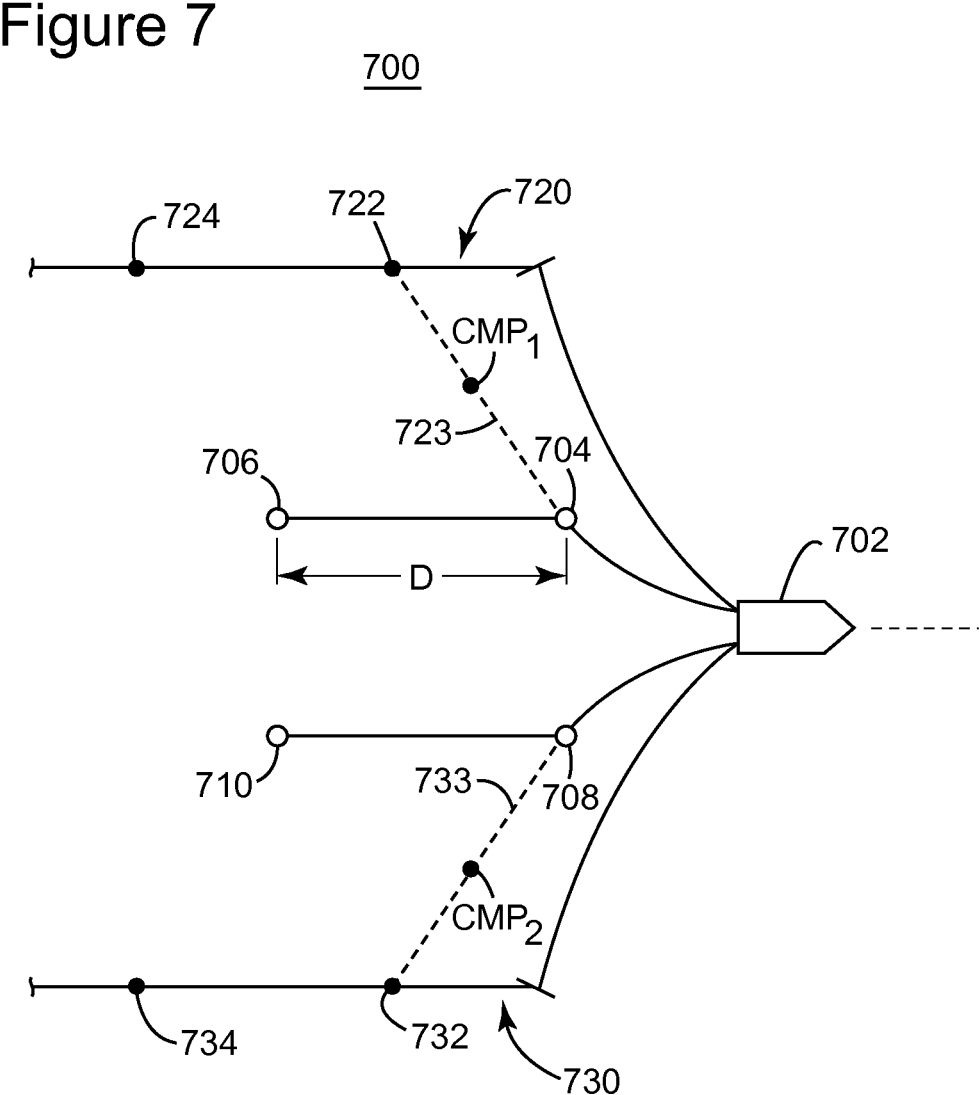
FIG. 7 is a schematic diagram of another seismic survey system according to an embodiment.

Another embodiment is illustrated in FIG. 7, in which four seismic sources are used to increase seismic survey efficiency. The seismic survey system 700 includes a vessel 702 towing four seismic sources 704, 706, 708 and 710. A receiver 722 on streamer 720 is illustrated as being connected by a ray path 723 to first source 704, and a receiver 732 on streamer 730 is illustrated as being connected by ray path 733 to third source 708. The CMP of source 704 and receiver 722 is CMP1 and the CMP of source 708 and receiver 732 is CMP2. As the vessel 702 advances by distance D, source 706 and receiver 724 will have CMP1 and source 710 and receiver 734 will have CMP2. Thus, these source-receiver pairs share the same offset and CMP while having different sensor depths, i.e., sensor 724 is assumed to have a different depth than sensor 722, and sensor 734 is assumed to have a different depth than sensor 732. Note that for this and the previous embodiment, a source is understood to be a source array, i.e., to include plural independent sources, such as air guns. In other words, sources 304 and 306 in FIGS. 3-5 and sources 704 to 710 in FIG. 7 each include plural independent sources.

Figure 8B:
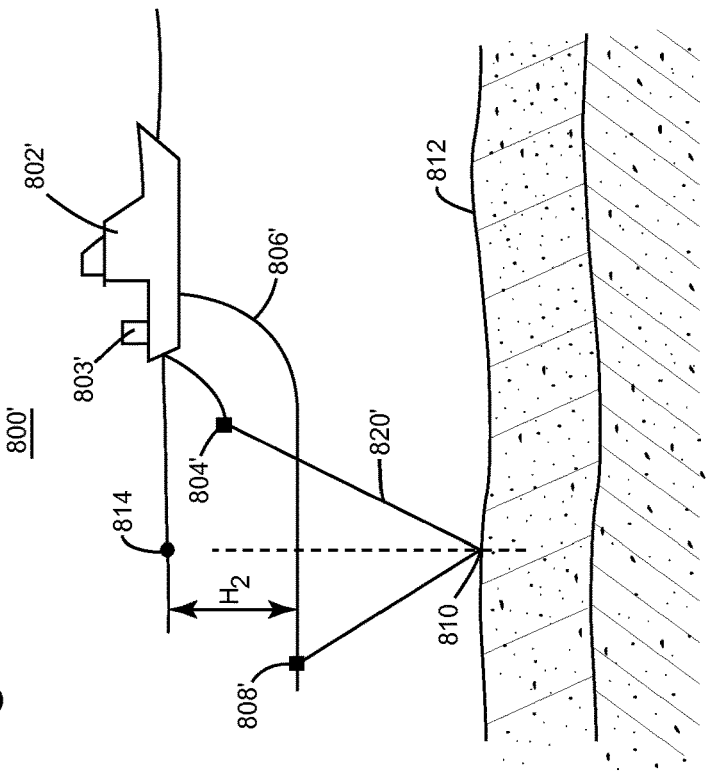
FIGS. 8A and 8B are side views of the seismic survey system of FIG. 7 at different times according to an embodiment.
Figure 8A:
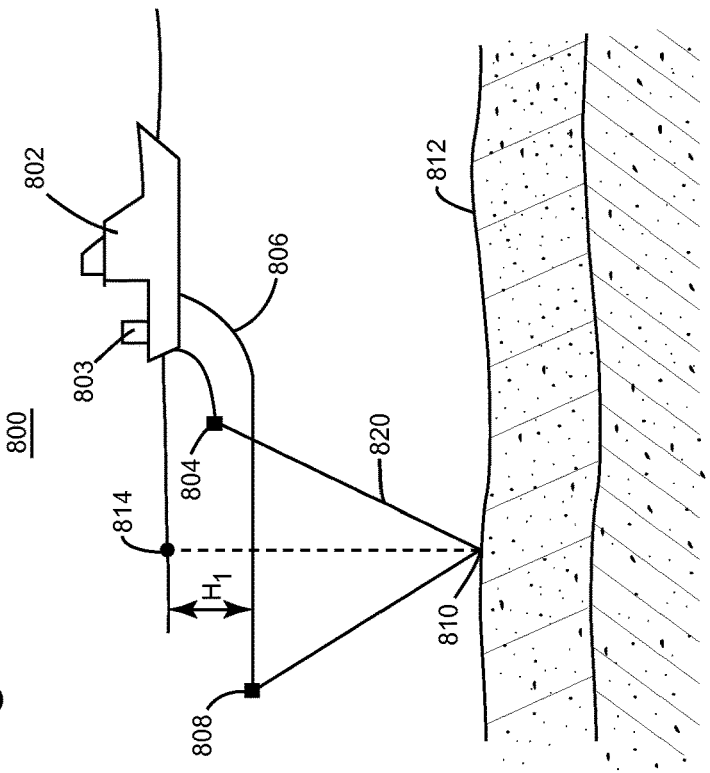

In another embodiment illustrated in FIGS. 8A and 8B, a vessel 802 tows a source array 804 and one or more streamers 806. The vessel may have a processor 803 configured to receive seismic recordings from one or more receivers distributed along the streamers. Processor 803 may be configured to process the collected data, i.e., apply seismic procedures as moveout, staking, migration, imaging, etc. A receiver 808 located on streamer 806 has a depth H1 because the streamer is horizontal. A wave 820 generated by source 804 reflects from a point 810, either on the ocean bottom 812 or another interface under the ocean bottom, and is recorded by receiver 808. The CMP 814 of this source-receiver pair is illustrated in FIG. 8A. Later in time, a different or the same seismic survey 800' (see FIG. 8B) is performed using a different or the same vessel 802'. The prime symbol is used herein to illustrate that a certain element (e.g., a streamer, source, etc.) may be different or the same as a corresponding element that does not have a prime symbol. Vessel 802' tows a source 804' and a streamer 806' that has a receiver 808' located at a depth H2, different than H1. The seismic wave 820' follows almost the same path as wave 820 from source 804' to receiver 808', the only exception being that the depth of sensor 808' is different from sensor 808's depth. Streamer 806' is shown in FIG. 8B to be horizontal. In one application, one or both of the two streamers 806 and 806' are curved, slanted or a combination of curved, slanted and horizontal. By collecting the data with this four-dimensional (4D) configuration (i.e., a base survey performed at time t1 and a monitor survey performed at a later time t2, for the same subsurface), it is also possible to combine both data and to deghost it by taking advantage of the fact that the depths of the streamers may be changed from one survey to the other, thus achieving the depth separation for the receivers.

Figure 8D:
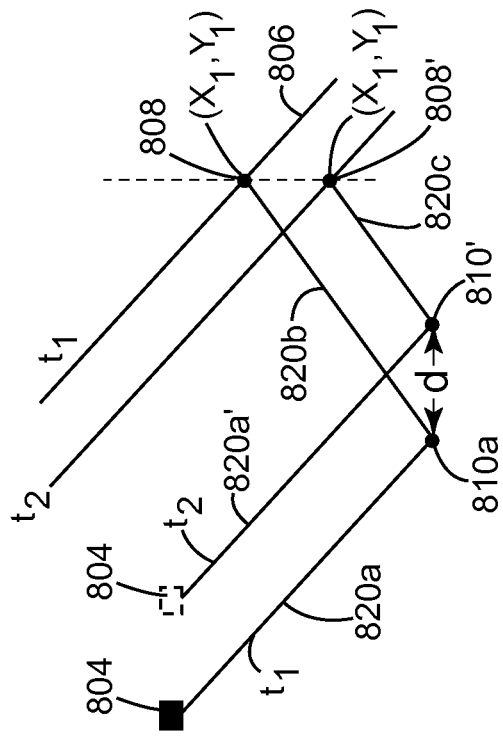
FIGS. 8C and 8D are side views of seismic surveys according to other embodiments.
Figure 8C:
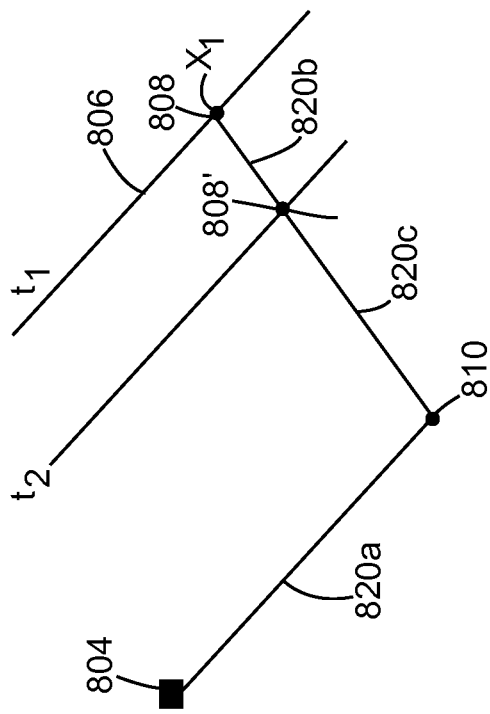

Two examples are illustrated in FIGS. 8C and 8D to further illustrate the applicability of these concepts. For simplicity, consider a single source 804 that shoots at times t1 and t2 and also a single slanted streamer 806 recording a signal at times t1 and t2. FIG. 8C illustrated the case in which a common-depth point 810 is the same at times t1 and t2 and also a location of source 804. The common-depth point includes a point where a wave emitted by a source reflects and follows a path leading to a seismic receiver. A common-depth point may have the same X and Y coordinates as the common mid-point. The set up illustrated in FIG. 8C replicates the raypath 820 at both times t1 and t2, i.e., a downgoing leg 820a from the source 804 to the common-depth point 810 and first 820b and second 820c up-going legs from the common-depth point 810 to the first 808 and second 808' receivers, respectively, whereby the first up-going leg 820b is a straight extension of the second up-going leg 820c.

Alternatively, as depicted in FIG. 8D, the horizontal receiver coordinates (X1, Y1) are replicated, albeit have the down-going 820a and first and second up-going legs 820b, 820c of the respective ray paths parallel and slightly offset (d is small) to each other.

In practice, the distances between the first and second receiver positions in FIG. 8C, or the difference in ray path in FIG. 8D, are so small as to record the same seismic signals. In other words, either the distances or the ray paths are substantially the same, i.e., close enough to record the same seismic signals.

Figure 9:
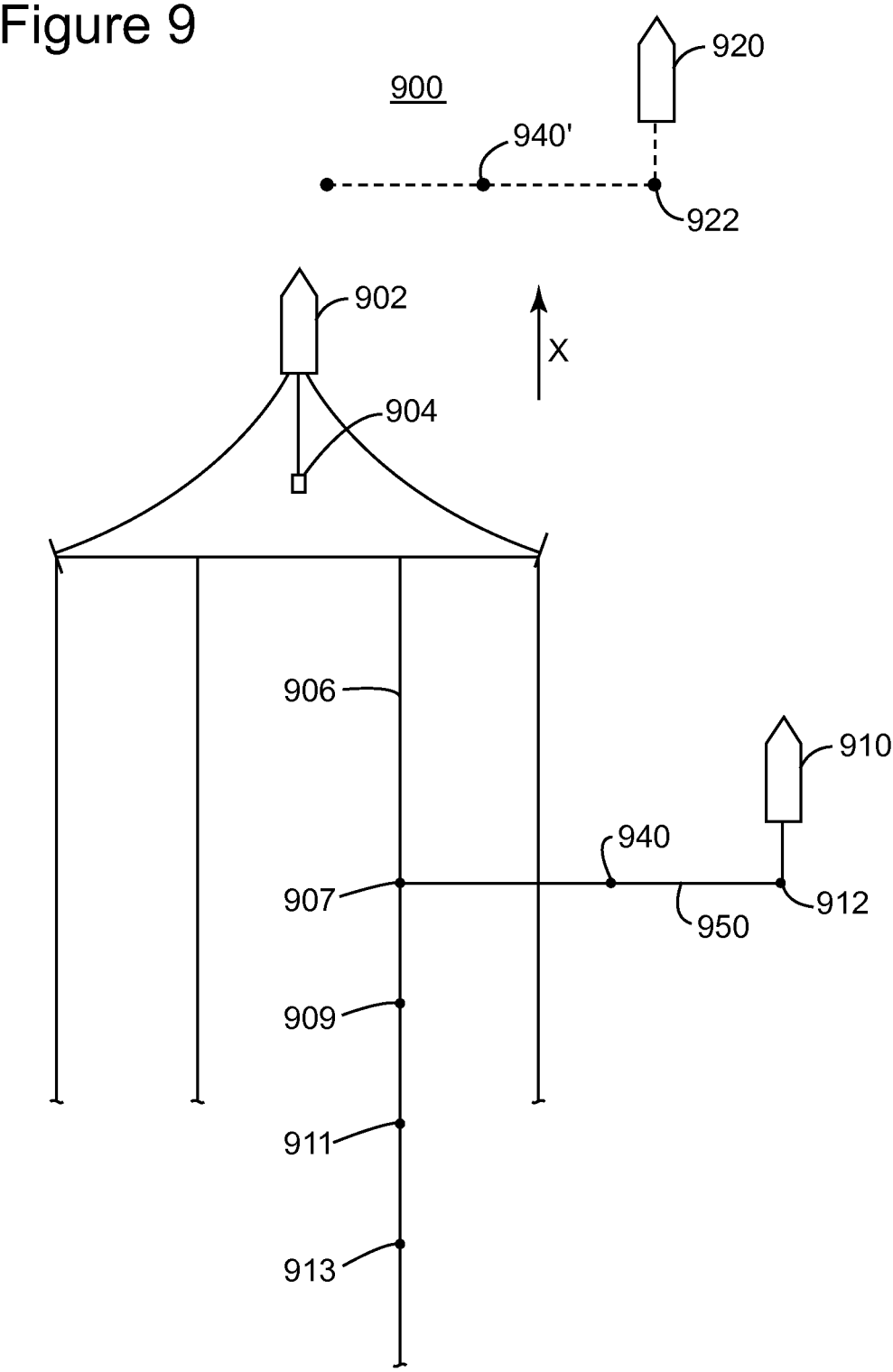
FIG. 9 is a schematic diagram of still another seismic survey system according to an embodiment.

Another embodiment is illustrated in FIG. 9 in which a seismic system 900 includes plural vessels. A first vessel 902 tows a source 904 and plural streamers 906. Streamers 906 are slanted or curved so that receivers 907, 909, 911 and 913 have different depths. A second vessel 910 tows a source 912. Note that the speed and positions of the vessels may be coordinated such that a line 950 passing through source 912 and receiver 907 forms an angle α with streamers 906. In one application, this angle is substantially 90°. For this arrangement, a CMP 940 for source 912 and receiver 907 becomes a new CMP for source 912 and receiver 909 when vessel 902 moves with a constant speed while vessel 910 is stationary.

Thus, it is possible to record seismic data with two different receivers 907 and 909 and having different depths and a same source 912 such that seismic data associated with a first pair (source 912 and receiver 907) and seismic data associated with a second pair (source 912 and receiver 911) share the same CMP and the same source-receiver offset.

Further, it is possible to maintain still source 912 so that farther receivers 911 and 913 along streamer 906 record seismic data with the same CMP and offset, but different receiver depths, to further improve the deghosting process. For this embodiment, once the last receiver on the streamer has passed line 950, vessel 910 may be instructed to move ahead of vessel 902 and then to repeat the process described in this embodiment. During the time vessel 910 moves to overcome vessel 902 along traveling direction X, a third vessel 920 may be stationed ahead of vessel 902 along direction X and use its source 922 to further generate seismic waves. In one application, vessel 910 does not have to wait until the last receiver of the streamers has passed line 950, but it may move ahead of vessel 902 as soon as two different receivers having different depths have passed line 950.

The embodiment discussed above may include more than one lateral vessel 910. For example, plural lateral vessels 910 may be used to increase the seismic survey's efficiency. Further, the embodiments illustrated in the figures are not intended to provide an exhaustive list of possible configurations. These are just a couple of possible configurations, and those skilled in the art might find other configurations that provide pairs of source-receivers having the same CMP and offset.

Figure 10:
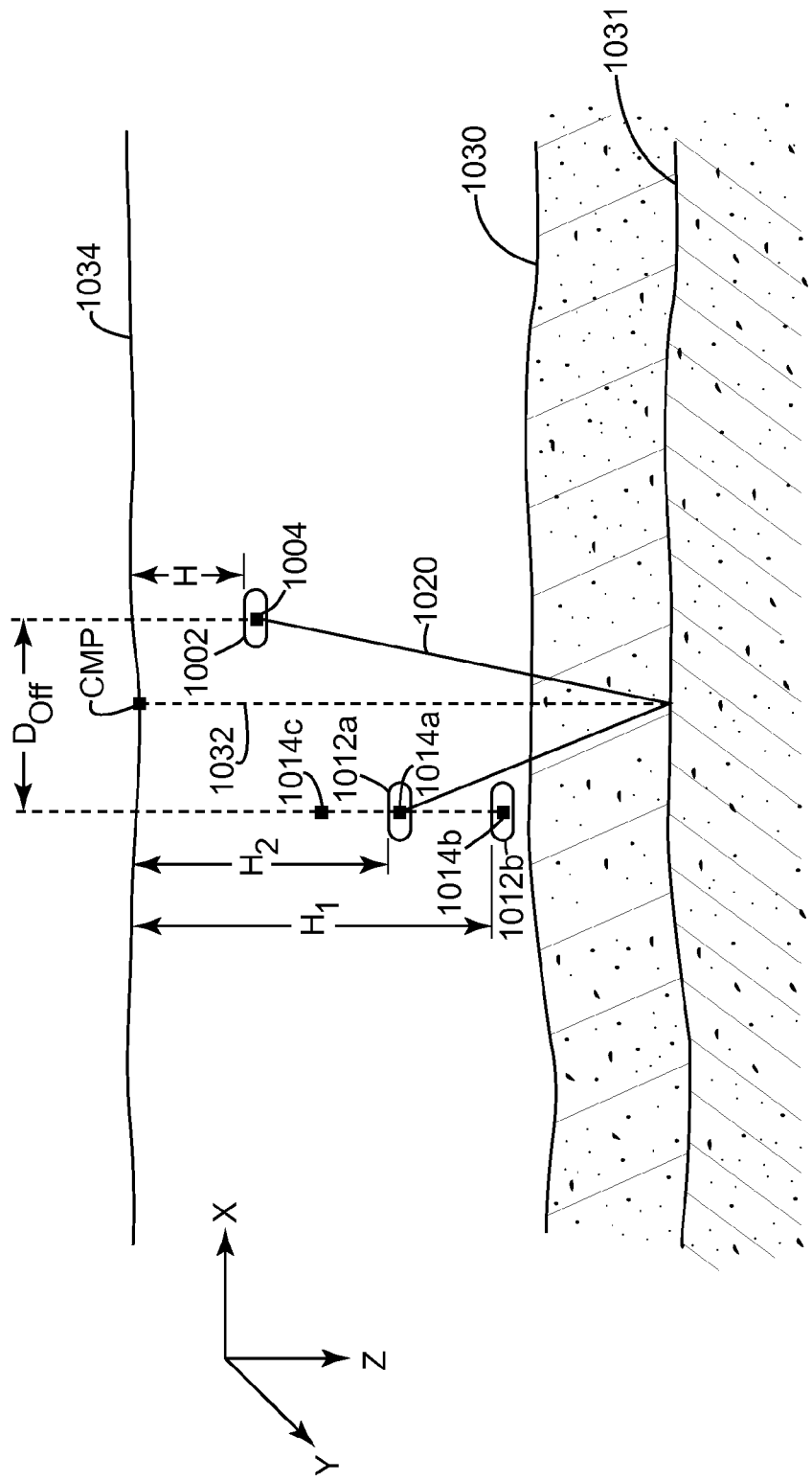
FIG. 10 is a schematic diagram of yet another seismic survey system according to an embodiment.

According to another embodiment that is illustrated in FIG. 10, at least first and second seismic data records are acquired during one or more seismic surveys by using not necessarily a source and a streamer towed by a vessel. For example, it is possible to have an autonomous source or sources and plural autonomous receivers that are not associated with a vessel and are configured to record the seismic data. One possibility is to have plural autonomous underwater vehicles (AUV) each carrying an appropriate receiver and/or source. FIG. 10 shows an AUV 1002 that carries a source 1004 and an AUV 1012*a* that carries a receiver 1014*a* and another AUV 1012*b* that carries a receiver 1014*b* or 1014*c*. Those skilled in the art would recognize that other configurations may be possible, i.e., source 1004 being towed by a vessel or attached to a remotely operated vehicle (ROV), receivers 1014*a* and 1014*b* being located on a glider or buoy, or one receiver being located on an AUV and the other receiver being located on the ocean bottom 1030 (e.g., ocean bottom node), or one receiver being located on a streamer and one receiver being located on the AUV or one receiver being located on the streamer and the other receiver being located on the ocean bottom, or even having only a single receiver and adjusting the depth of the AUV from H1 to H2. The same is true for source 1004, i.e., it is possible to have a single source or multiple sources.

Irrespective of the chosen configuration for the number of receivers and sources and for their carriers, according to an embodiment, the first and second seismic data records have the following features independent of the physical configuration of the seismic survey. The first seismic data record includes seismic data recorded at a first depth H1 while the second seismic data record includes seismic data recorded at a second depth H2. A difference between the first depth H1 and the second depth H2 is significant, e.g., tens of meters. The recorded seismic data includes (1) seismic waves that underwent a seismic event after being generated by the source and (2) a corresponding ghost. A seismic event may include one or more of a reflection, refraction, diffraction, multiple, etc. Further, source 1004 generates the seismic waves for both the first and second records at substantially the same depth H. If two sources are used, the two sources should generate the seismic waves that are recorded in the first and second record at substantially the same depth.

Furthermore, considering that a position (Xs, Ys, Zs) where source 1004 or first and second sources are being shot, a first receiver position (X1, Y1, Z1=H1) where the seismic data of the first record is being recorded, and a second receiver position (X2, Y2, Z2=H2) where the seismic data of the second record is being recorded, an offset distance Doff between the source position (Xs, Ys, Zs) and the first receiver position (X1, Y1, Z1=H1) should be substantially equal to an offset distance between the source position (Xs, Ys, Zs) and the second receiver position (X2, Y2, Z2=H2), where the offset distance is measured in the XY plane.

In addition, considering that the CMP of the first record has coordinates (Xcmp, Ycmp, Zcmp), the CMP of the second record should have substantially the same coordinates. With these conditions in place, after recording the first and second records, one or more of the above processing techniques may be applied to form a deghosted seismic data record. Thus, those skilled in the art would recognize that the physical configuration of the acquisition system 1000 may change as long as the positioning of the receivers and sources respect the above conditions in order to be able to deghost the recorded seismic data as noted above.

Further, the first and second records may be used to generate a CMP gather for further processing. The CMP gather is constructed in the pre-stack domain. The above discussed method may also be applied not only to data recorded with actual receivers but also to data obtained from interpolation and/or regularization, i.e., data that would have been observed at the first and second receiver locations or data that have been generated at the source location and have substantially the same source-receiver offset, substantially the same common mid-point and significantly different receiver depths. Note that in this description the term common mid-point is used but ideally, a common depth-point shall be used.

Figure 11A:
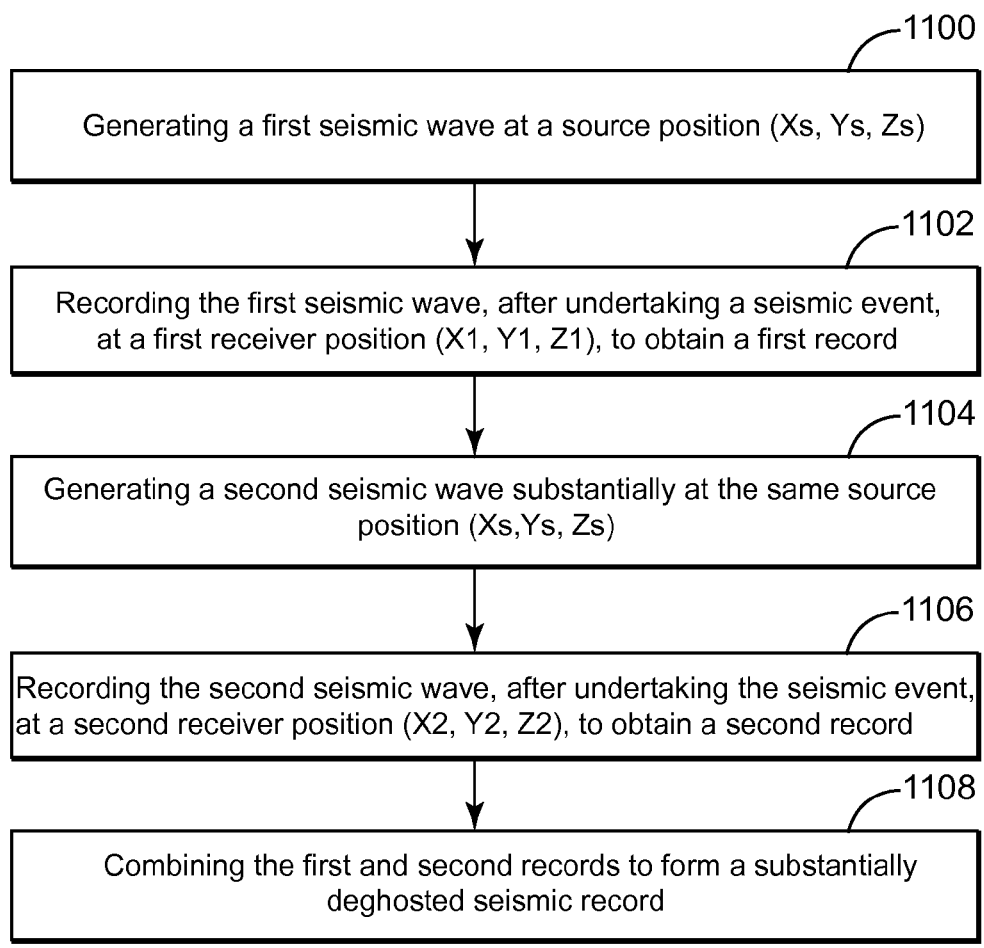
FIGS. 11A and 11B are flow-charts of a method for deghosting seismic data according to an embodiment.

According to an embodiment illustrated in FIG. 11A, there is a method for seismic data acquisition and processing. The method includes a step 1100 of generating a first seismic wave at a source position (Xs, Ys, Zs); a step 1102 of recording the first seismic wave, after undertaking a seismic event, at a first receiver position (X1, Y1, Z1), to obtain a first record; a step 1104 of generating a second seismic wave substantially at the same source position (Xs, Ys, Zs); a step 1106 of recording the second seismic wave, after undertaking the seismic event, at a second receiver position (X2, Y2, Z2), to obtain a second record; and a step 1108 of combining the first and second records to form a substantially deghosted seismic record. The first receiver position and the source position are characterized by a first source-receiver offset and a first common depth-point, the second receiver position and the source position are characterized by a second source-receiver offset and a second common depth-point. The first source-receiver offset is substantially the same as the second source-receiver offset, the first common depth-point is substantially the same as the second common depth-point, and a first depth (Z1) of the first receiver position is significantly different than a second depth (Z2) of the second receiver position.

Figure 11B:
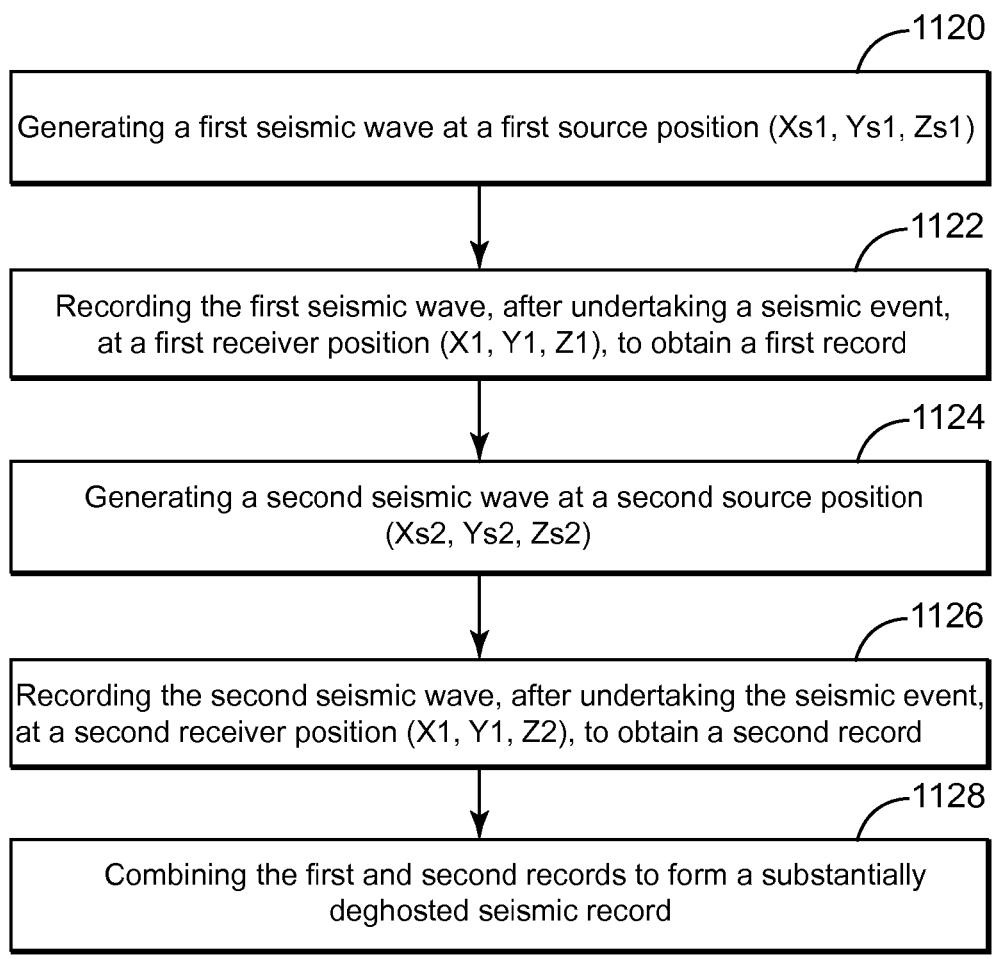

According to another embodiment illustrated in FIG. 11B, there is a method for seismic data acquisition and processing. The method includes a step 1120 of generating a first seismic wave at a first source position (Xs1, Ys1, Zs1); a step 1122 of recording the first seismic wave, after undertaking a seismic event, at a first receiver position (X1, Y1, Z1), to obtain a first record; a step 1124 of generating a second seismic wave at a second source position (Xs2, Ys2, Zs2); a step 1126 of recording the second seismic wave, after undertaking the seismic event, at a second receiver position (X1, Y1, Z2), to obtain a second record; and a step 1128 of combining the first and second records to form a substantially deghosted seismic record. A first depth (Z1) of the first receiver position is substantially different from a second depth (Z2) of the second receiver position.

Figure 12:
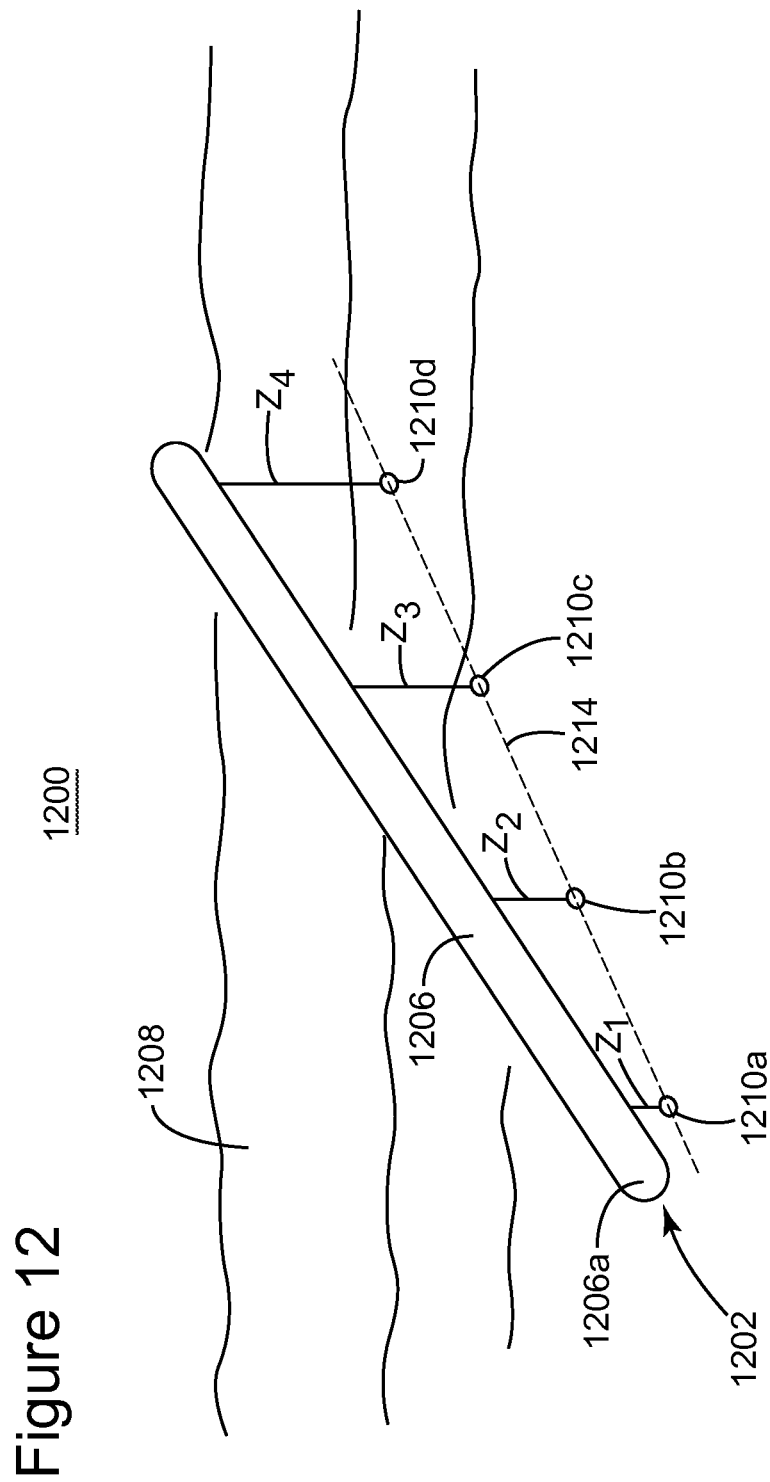
FIG. 12 is a schematic diagram of a broadband source according to an embodiment.

The above embodiments may be used with a multi-level source as illustrated in FIG. 12. A multi-level source 1200 has one or more sub-arrays. The first sub-array 1202 has a float 1206 configured to float at the water surface 1208 or underwater at a predetermined depth. Plural source points 1210*a-d* are suspended from float 1206 in a known manner. A first source point 1210*a* may be suspended closest to the head 1206*a* of float 1206, at a first depth z1. A second source point 1210*b* may be suspended next, at a second depth z2, different from z1. A third source point 1210*c* may be suspended next, at a third depth z3, different from z1 and z2, and so on. FIG. 12 shows, for simplicity, only four source points 1210*a-d*, but an actual implementation may have any desired number of source points. In one application, because the source points are distributed at different depths, the source points at different depths are not simultaneously activated. In other words, the source array is synchronized, i.e., a deeper source point is activated later in time (e.g., 2 ms for 3 m depth difference when the speed of sound in water is 1500 m/s) such that corresponding sound signals produced by the plural source points coalesce, and thus, the overall sound signal produced by the source array appears as a single sound signal.

Depths z1 to z4 of the first sub-array 1202 source points may obey various relationships. In one application, the source points' depths increase from the head toward the tail of the float, i.e., z1<z2<z3<z4. In another application, the source points' depths decrease from the head to the tail of the float. In another application, the source points are slanted on an imaginary line 1214. In still another application, line 1214 is straight. In yet another application, line 1214 is curved, e.g., part of a parabola, circle, hyperbola, etc. In one application, first source point depth for the sub-array 1202 is about 5 m and the greatest depth of the last source point is about 8 m. In a variation of this embodiment, the depth range is between 8.5 and 10.5 m or between 11 and 14 m. In another variation of this embodiment, when line 1214 is straight, the source points' depths increase by 0.5 m from a source point to an adjacent source point. Those skilled in the art would recognize that these ranges are exemplary, and these numbers may vary from survey to survey. A common feature of all these embodiments is that the source points have variable depths so a single sub-array exhibits multiple-level source points.

Figure 13:
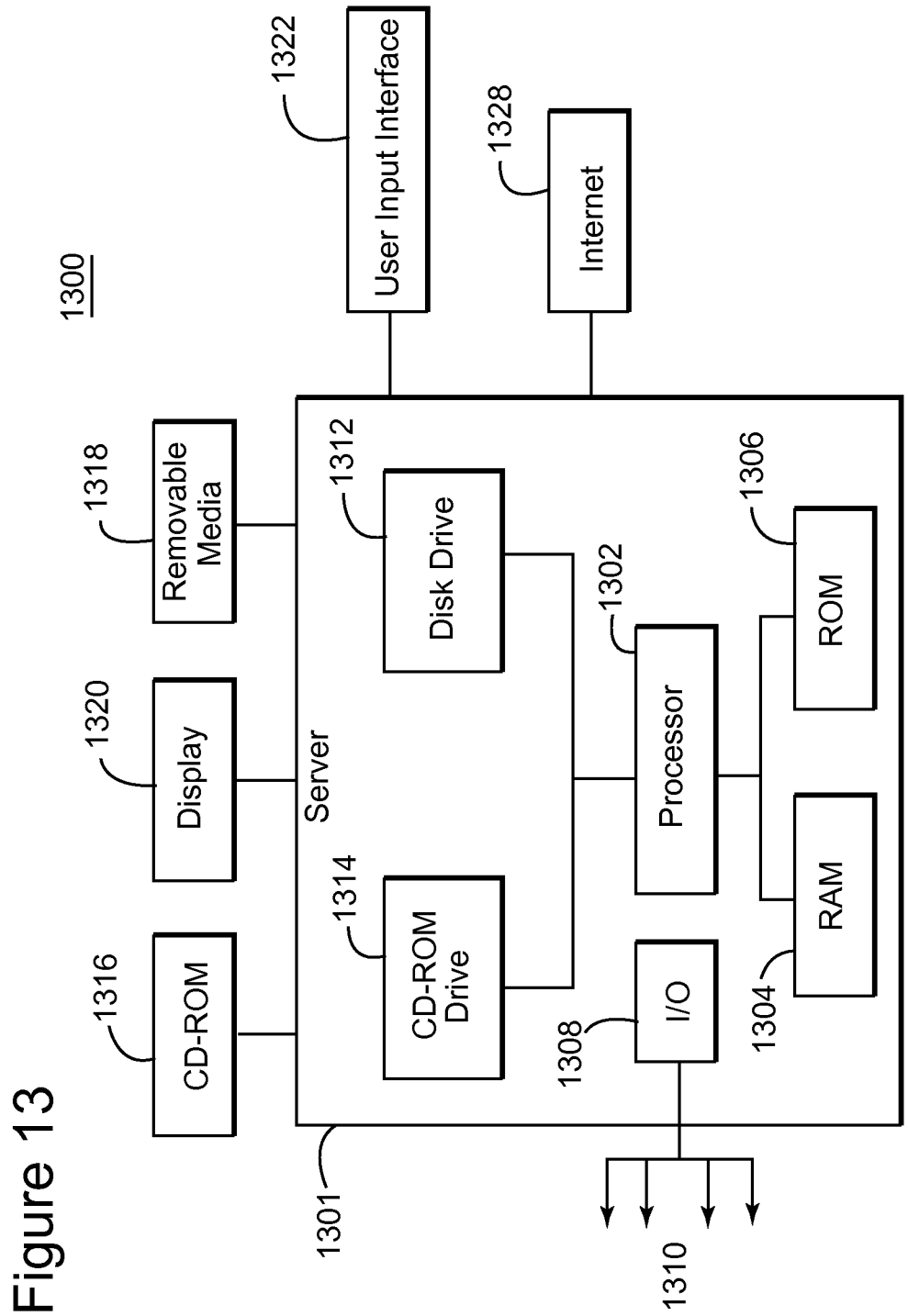
FIG. 13 is a schematic diagram of a computing device.

The above discussed procedures and methods may be implemented in a computing device (e.g., 803) as illustrated in FIG. 13. Hardware, firmware, software or a combination thereof may be used to perform the various steps and operations described herein. The computing device 1300 of FIG. 13 is an exemplary computing structure that may be used in connection with such a system.

Exemplary computing device 1300 suitable for performing activities described in the exemplary embodiments may include a server 1301. Such a server 1301 may include a central processor (CPU) 1302 coupled to a random access memory (RAM) 1304 and to a read-only memory (ROM) 1306. ROM 1306 may also be other types of storage media to store programs, such as programmable ROM (PROM), erasable PROM (EPROM), etc. Processor 1302 may communicate with other internal and external components through input/output (I/O) circuitry 1308 and bussing 1310, to provide control signals and the like. Processor 1302 carries out a variety of functions as are known in the art, as dictated by software and/or firmware instructions.

Server 1301 may also include one or more data storage devices, including hard and floppy disk drives 1312, CD-ROM drives 1314, and other hardware capable of reading and/or storing information such as DVD, etc. In one embodiment, software for carrying out the above-discussed steps may be stored and distributed on a CD-ROM 1316, removable media 1318 or other form of media capable of portably or not storing information. These storage media may be inserted into, and read by, devices such as the CD-ROM drive 1314, the disk drive 1312, etc. Server 1301 may be coupled to a display 1320, which may be any type of known display or presentation screen, such as LCD display, plasma display, cathode ray tubes (CRT), etc. A user input interface 1322 is provided, including one or more user interface mechanisms such as a mouse, keyboard, microphone, touch pad, touch screen, voice-recognition system, etc.

Server 1301 may be coupled to other devices, such as sources, detectors, etc. The server may be part of a larger network configuration as in a global area network (GAN) such as the Internet 1328, which allows ultimate connection to various landline and/or mobile computing devices.

The disclosed exemplary embodiments provide an apparatus and a method and a computer medium for seismic data acquisition that enhances the frequency content of the recorded data for processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic data acquisition and processing, the method comprising:
    generating a first seismic wave at a source position (Xs, Ys, Zs);
    recording the first seismic wave, after undertaking a seismic event, at a first receiver position (X1, Y1, Z1), to obtain a first record;
    generating a second seismic wave substantially at the same source position (Xs, Ys, Zs);
    recording the second seismic wave, after undertaking the seismic event, at a second receiver position (X2, Y2, Z2), to obtain a second record; and
    combining the first and second records to form a substantially deghosted seismic record,
    wherein the first receiver position and the source position are characterized by a first source-receiver offset and a first common mid-point, the second receiver position and the source position are characterized by a second source-receiver offset and a second common mid-point, and
    the first source-receiver offset is substantially the same as the second source-receiver offset, the first common mid-point is substantially the same as the second common mid-point, and a first depth (Z1) of the first receiver position is different from a second depth (Z2) of the second receiver position.

2. The method of claim 1, wherein a depth difference between the first depth and the second depth is calculated such that a first seismic ghost recorded by the first receiver and a second seismic ghost recorded by the second receiver differ significantly from each other.

3. The method of claim 1, wherein the step of combining further comprises:
    collecting location information of the source position, the first receiver position, the second receiver position, and time information of generating the first and second seismic waves.

4. The method of claim 1, wherein a first receiver recording the first seismic wave in the first receiver position and a second receiver recording the second seismic wave in the second receiver position are disposed along a streamer that is non-uniformly horizontal.

5. The method of claim 1, wherein a first receiver recording the first seismic wave in the first receiver position and a second receiver recording the second seismic wave in the second receiver position are disposed along a streamer that is slanted.

6. The method of claim 1, wherein a first receiver recording the first seismic wave in the first receiver position and a second receiver recording the second seismic wave in the second receiver position are disposed along a streamer that is curved in a vertical plane.

7. The method of claim 1, wherein a first receiver recording the first seismic wave in the first receiver position and a second receiver recording the second seismic wave in the second receiver position are located on autonomous underwater vehicles and/or streamers.

8. The method of claim 1, wherein first and/or second sources are sequentially located at the source location and actuated sequentially, or randomly or simultaneously.

9. The method of claim 1, wherein the step of combining further comprises:
   deghosting the first and second records by using at least one of (1) brute stacking, (2) pre-stack deconvolution and stacking, or (3) matched filtering, pre-stack deconvolution and stacking.

10. The method of claim 1, wherein a source located at the source location is a broadband source.

11. The method of claim 1, further comprising:
    translating the first source and/or the second source by a vessel or an unmanned surface vehicle.

12. The method of claim 1, further comprising:
    generating an image of the subsurface based on deghosted seismic record.

13. The method of claim 1, wherein the first or second record is transformed by reciprocity into a record that would have been obtained if the source location and the first or second receiver location were interchanged.

14. The method of claim 1, further comprising:
    constructing a CMP gather based on the first and second records.

15. The method of claim 1, wherein the first and/or second records include processed data that would have been observed at the first or second receiver positions or processed data that would have been generated at the source location.

16. The method of claim 15, wherein processed includes at least one of interpolation or regularization.

17. A seismic data acquisition system comprising:
    a seismic source configured to generate first and second seismic waves at a source position (Xs, Ys, Zs);
    a first receiver configured to record the first seismic wave, after undertaking a seismic event, at a first receiver position (X1, Y1, Z1), to obtain a first record;
    a second receiver configured to record the second seismic wave, after undertaking the seismic event, at a second receiver position (X2, Y2, Z2), to obtain a second record; and
    a processor combining the first and second records to form a substantially deghosted seismic record,
    wherein the first receiver position and the source position are characterized by a first source-receiver offset and a first common mid-point, the second receiver position and the source position are characterized by a second source-receiver offset and a second common mid-point, and
    the first source-receiver offset is substantially the same as the second source-receiver offset, the first common mid-point is substantially the same as the second common mid-point, and a first depth (Z1) of the first receiver position is different from a second depth (Z2) of the second receiver position.

18. A method for seismic data acquisition and processing, the method comprising:
    generating a first seismic wave at a first source position (Xs1, Ys1, Zs1);
    recording the first seismic wave, after undertaking a seismic event, at a first receiver position (X1, Y1, Z1), to obtain a first record;
    generating a second seismic wave at a second source position (Xs2, Ys2, Zs2);
    recording the second seismic wave, after undertaking the seismic event, at a second receiver position (X1, Y1, Z2), to obtain a second record; and
    combining the first and second records to form a substantially deghosted seismic record,
    wherein a first depth (Z1) of the first receiver position is different from a second depth (Z2) of the second receiver position, and
    wherein a first common mid-point of the first source position and the first receiver position is equal to a second common mid-point of the second source position and the second receiver position.

19. The method of claim 18, wherein a first path followed by a first ray from the first source position to the first receiver position via the first common mid-depth point is substantially parallel to a second path followed by a second ray from the second source position to the second receiver position via the second common mid-depth point.

20. The method of claim 18, wherein a first path followed by a first ray from the first source position to the first receiver position via the first common mid-depth point is substantially the same as a second path followed by a second ray from the second source position to the second receiver position via the second common mid-depth point.

21. A seismic survey system for seismic data acquisition and processing, the system comprising:
    a source configured to generate a first seismic wave at a first source position (Xs1, Ys1, Zs1) and a second seismic wave at a second source position (Xs2, Ys2, Zs2);
    a first receiver recording the first seismic wave, after undertaking a seismic event, at a first receiver position (X1, Y1, Z1), to obtain a first record;
    a second receiver recording the second seismic wave, after undertaking the seismic event, at a second receiver position (X1, Y1, Z2), to obtain a second record; and
    a processor configured to combine the first and second records to form a substantially deghosted seismic record,
    wherein a first depth (Z1) of the first receiver position is different from a second depth (Z2) of the second receiver position, and
    wherein a first common mid-point of the first source position and the first receiver position is equal to a second common mid-point of the second source position and the second receiver position.

* * * * *